(Model.)

C. F. RILEY.
VELOCIPEDE.

No. 292,179. Patented Jan. 22, 1884.

WITNESSES:
Theo. G. Hoster
C. Sedgwick

INVENTOR:
C. F. Riley
BY Munn & Co
ATTORNEYS.

UNITED STATES PATENT OFFICE.

CHRISTIAN F. RILEY, OF PHILADELPHIA, PENNSYLVANIA.

VELOCIPEDE.

SPECIFICATION forming part of Letters Patent No. 292,179, dated January 22, 1884.

Application filed June 15, 1883. (Model.)

*To all whom it may concern:*

Be it known that I, CHRISTIAN F. RILEY, of Philadelphia, in the county of Philadelphia and State of Pennsylvania, have invented a new and Improved Velocipede, of which the following is a full, clear, and exact description.

My invention consists of improved means of coupling the guiding or steering and driving axle of a hand crank-power velocipede with the reach or bed-frame of the hind axle, and also devices for steering or guiding the driving-wheels by the feet of the rider, the object being to provide a simple, efficient, and durable machine, all as hereinafter fully described.

Reference is to be had to the accompanying drawings, forming a part of this specification, in which similar letters of reference indicate corresponding parts in both the figures.

Figure 1:
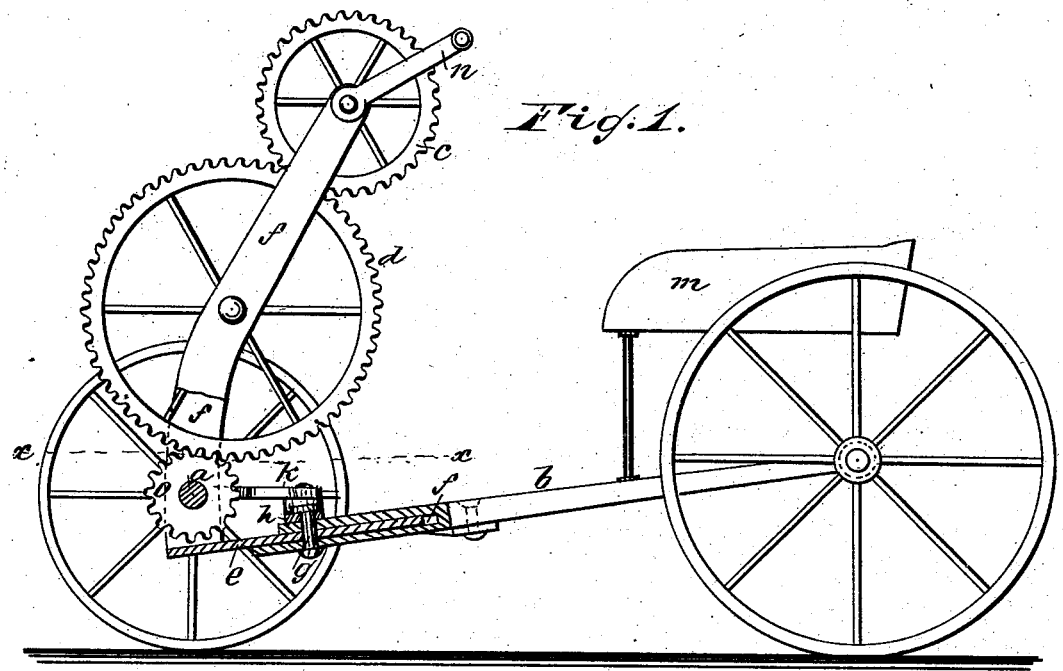
Figure 2:
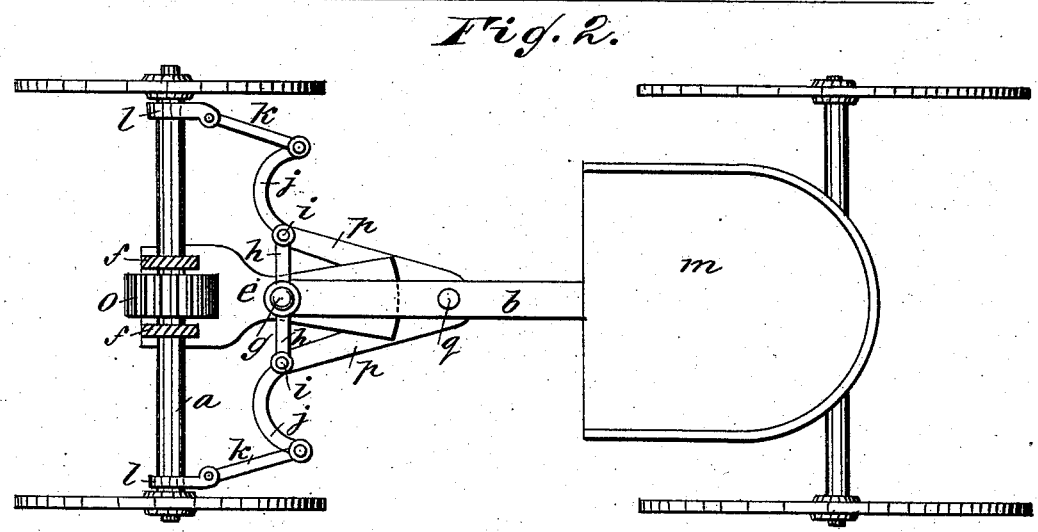

Figure 1 is partly a side elevation and partly a sectional elevation of my improved velocipede, and Fig. 2 is a plan view.

For coupling the front axle, $a$, to the bed-frame or reach $b$, and mounting the driving-gear, consisting of the hand crank-wheel $c$ and the intermediate wheel, $d$, on said axle, I employ a fifth-wheel, $e$, having a couple of upright standards or yoke, $f$, through which the axle is fitted for mounting said standards on it for the support of the said driving-gear, the said fifth-wheel $e$ being arranged in a slot, $f'$, of the reach $b$, and pivoted to the end of the reach at $g$, for the turning-point of the front axle for directing the course of the machine. The extension of the fifth-wheel $e$ back of the pivot $g$, along the slot $f'$ of the reach $b$, is arranged for substantial vertical rigidity of the joint. From the end of the reach I have an arm, $h$, projecting from each side a suitable distance for the support of the pivots $i$ of foot-levers $j$, which are connected by rods $k$ and collars $l$ with the axle $a$, for the means of turning the axle by pressure on the levers $j$ by the feet of the operator, who sits on the seat $m$, to ride and to propel the machine by the hand-cranks $n$, from which the power is transmitted by the wheels $c$ and $d$ to the pinion $o$ on the axle, said wheels $c$ and $d$ being mounted in the uprights $f$, which project upward and backward suitably for supporting the cranks in such relation to the seat as will enable the operator to work them conveniently while sitting on the seat.

In practice I propose to mount the wheels $c$ and $d$ so that they can be readily taken out to substitute others of different proportions for different speeds. The arms $h$ are stayed by braces $p$, attached to the reach at $q$, for strength to resist the threads of the levers $j$ by the feet of the operator.

Having thus described my invention, I claim as new and desire to secure by Letters Patent—

1. The combination, with the reach $b$ and the axle $a$, of the fifth-wheel $e$, having uprights $f$ for the support of the driving-gear, and being arranged in the slot $f'$ of the reach $b$, and pivoted to the end of the reach at $g$, substantially as described.

2. The combination of the arms $h$, foot-levers $j$, connecting-rods $k$, and collars $l$ with the reach $b$, fifth-wheel $e$, axle $a$, and the driving-gears for applying the power to the axle, substantially as described.

CHRISTIAN F. RILEY.

Witnesses:
   CHAS. H. WHITE,
   ROBT. N. BARBER.